Nov. 17, 1931.  A. NUTT  1,832,320

CRANK CASE OIL SEAL

Filed Jan. 14, 1927

INVENTOR
ARTHUR NUTT.
BY
ATTORNEY

Patented Nov. 17, 1931

1,832,320

UNITED STATES PATENT OFFICE

ARTHUR NUTT, OF KENMORE, NEW YORK, ASSIGNOR TO CURTISS AEROPLANE & MOTOR COMPANY, INC., A CORPORATION OF NEW YORK

CRANK CASE OIL SEAL

Application filed January 14, 1927. Serial No. 161,174.

My invention relates to internal combustion motors.

An object of the invention is to provide in an internal combustion motor, and especially in an aeronautical internal combustion motor, a novel type of oil seal by means of which all leakage of oil is prevented in and around the crank case opening thru which the propeller end of the crank shaft extends.

A further object of the invention is to provide a crank case oil seal in which a bearing surface carried by and rotatable with the crank shaft is adapted to cooperate with a non-rotatable similar bearing surface carried by the crank case, the cooperating bearing surfaces being yieldably held in sufficiently firm frictional contact to prevent oil leakage therebetween.

A still further object of the invention is to so mount and construct said non-rotatable bearing surface as to admit of its movement axially of the crank shaft without creating in and around said surface a passage for the escape of oil.

Other objects and advantages of the invention will be hereinafter set forth.

Figure 1:
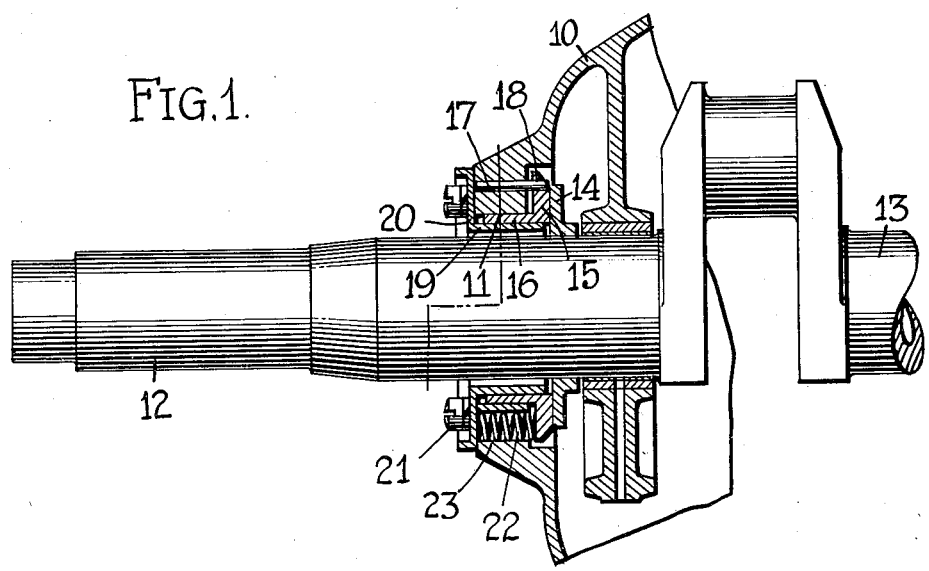
Figure 2:
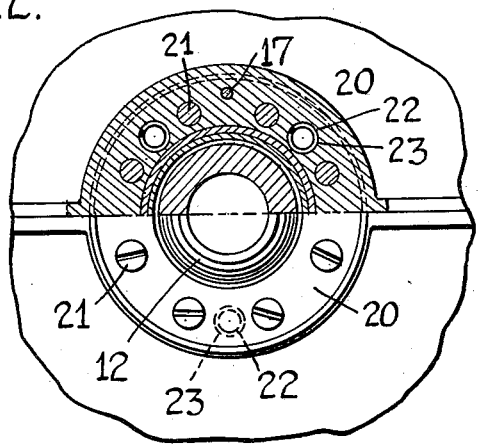

In the drawings, wherein like reference characters denote like or corresponding parts Fig. 1 is a vertical sectional view of the propeller end of an aeronautical motor crank case showing the relation of the oil seal thereto and to the crank shaft of the motor, and Fig. 2 is a transverse vertical sectional view on the line 2—2 of Fig. 1.

In the embodiment of the invention selected for illustration, only that portion of the motor crank case 10 in the vicinity of the propeller end thereof is shown. At said end the crank case 10 has formed therein an opening 11 thru which the propeller extension 12 of the crank shaft 13 of the motor extends. In an aeronautical motor, due to the inclined angles which the motor is required to assume in practice, it is not an uncommon occurrence for the crank case oil to leak out of the crank case in and around the extension 12 of the crank shaft and thru the opening 11 beyond which said shaft extends. To prevent such leakage it has been the common practice heretofore to provide at such opening and within the crank case, cooperating bearing surfaces carried respectively by the crank shaft and the crank case.

While the present invention embodies also the essential cooperating bearing surfaces, such surfaces are so related one to each other as to admit of firm frictional contact therebetween under all circumstances and for an indefinite period. The crank shaft 13 has shrunk tightly thereon, in the vicinity of the crank case opening 11, an annular bearing surface 14 which extends off from the crank shaft at an angle. This bearing surface is accordingly fixed in its relation to the crank shaft to rotate with it. For cooperation with said bearing surface 14 a non-rotatable bearing surface 15 is provided. This latter bearing surface is preferably constructed in the form of an annular flange extending radially out from a ring 16 which encircles the crank shaft extension 12 and which is adapted to snugly engage in the opening 11 of the crank case. A pin 17 carried by the crank case and fitting, at its inner end, an opening 18 formed in said bearing surface 15, is adapted to hold said bearing surface against rotation and yet permit of its movement axially of the crank shaft as will hereinafter appear.

In addition to the ring 16 upon which the flange or bearing surface 15 is formed, I provide a second inner ring 19. This latter ring also encircles the crank shaft extension 12. In diameter it (the ring 19) is smaller than the ring 16 to snugly engage therein, i. e., the two rings 16 and 19 are adapted to overlap. At its outer end said ring 19 has formed thereon an annular flange 20 which is adapted to bear against the outer end wall of the crank case. By means of bolts 21 extending thru said flange 20, the ring 19 is fastened firmly in place.

It will be noted from the above that the flanges 15 and 20 extend radially out from the crank shaft extension 12 in spaced relation. It will be further noted that the outer ring 16, except for the pin fastening 17 is loosely mounted. The purpose of thus mounting said ring 16 is to permit of its movement axially within the opening 11 of the crank case toward and from the flange or bearing surface 14 carried by the crank shaft. The flange or bearing surface 15 of said ring 16 and the flange or bearing surface 14 of the crank shaft 13 are adapted to bear one upon the other at all times. Such bearing contact is established and maintained by springs 22 fitting in openings 23 formed in the crank case radially about the opening 11 therein, and bearing on the flanges 15 and 20 of the overlapping rings. Since the flange 20 of the inner ring 19 is fixed in its relation to the crank case, and since the flange 15 of the outer ring 16 is axially movable within the crank case opening, obviously the expanding force of the springs 22 will hold said bearing surface 15 in sufficiently firm frictional contact with the bearing surface 14 to prevent oil leakage therebetween.

A crank case oil seal thus characterized is especially desirable in an aeronautical motor. Not only are the bearing surfaces 14 and 15 so related one to the other as to prevent oil leakage therebetween, but the mounting for the ring 16 is such that the oil is prevented from leaking out in and around said ring due to the tortuous passage the escaping oil is required to follow and due also to the fact that the overlapping rings snugly engage at all times. Such an oil seal functions perfectly regardles of the angle of inclination of the motor.

While I have described my invention in detail in its present preferred embodiment, it will be obvious to those skilled in the art after understanding my invention, that various changes and modifications may be made therein without departing from the spirit or scope thereof. I aim in the appended claims, to cover all such modifications and changes.

What I claim is:

1. For use in combination with a casing having an opening through which a shaft extends and in which the casing is formed with an inner wall for the portion surrounding the opening, an outer wall for said portion, and a defining wall for the opening; a seal for the opening comprising an inner ring fixed to said casing, an axially movable though non-rotatable outer ring snugly engaging in said opening between the defining wall of said opening and the outer surface of said inner ring and overlapping said inner ring, an annular flange formed on each said ring, said flanges being extended, in each instance, in an outward direction to over-lie respectively the inner wall of and the outer wall of that portion of said casing surrounding said opening, an annular bearing surface formed on said shaft within said casing and against which the flange formed on said outer ring is adapted to frictionally bear, and means bearing at one end on said outer ring flange for yieldingly maintaining said outer ring flange in bearing contact with said bearing surface.

2. A seal for an opening in a casing through which a shaft extends, comprising an inner ring fixed to said casing, an axially movable though non-rotatable outer ring snugly engaging in the opening between the defining wall of said opening and the outer surface of said inner ring and overlapping said inner ring, an annular flange formed on each said ring, an annular bearing surface formed on said shaft against which the flange formed on said outer ring is adapted to bear frictionally, and means bearing at one end on the said outer ring flange for yieldingly maintaining said flange in bearing contact with said bearing surface.

3. A seal for an opening in a casing through which a shaft extends, comprising an inner ring fixed to said casing, an axially movable though non-rotatable outer ring overlapping said inner ring, an annular flange formed on each said ring, said flanges being extended in each instance in an outward direction to overlie respectively the inner wall of and the outer wall of that portion of said casing surrounding said opening, an annular bearing surface formed on said shaft against which the flange formed on said outer ring is adapted to bear frictionally, and means bearing at one end on said outer ring flange for yieldingly maintaining said flange in bearing contact with said bearing surface.

4. A seal for an opening in a casing through which a shaft extends, comprising an inner ring fixed to said casing, an axially movable though non-rotatable outer ring overlapping said inner ring, an annular flange formed on each said ring, an annular bearing surface formed on said shaft within said casing and against which the flange formed on said outer ring is adapted to bear frictionally, and means bearing at one end on said outer ring flange and at the other end on said inner ring flange for yieldingly maintaining said flange in bearing contact with said bearing surface.

5. A seal for an opening in a casing through which a shaft extends, comprising an inner ring fixed to said casing, an axially movable though non-rotatable outer ring overlapping said inner ring, an annular flange formed on each said ring, an annular bearing surface formed on said shaft against which the flange formed on said outer ring is adapted to bear frictionally, and means bearing at one end on said outer ring flange and engaging in openings formed in said casing at points spaced circumferentially about the defining wall of said shaft opening for yieldingly maintaining said flange in bearing contact with said bearing surface.

6. A seal for an opening in a casing through which a shaft extends, comprising an inner ring fixed to said casing, an axially movable though non-rotatable outer ring overlapping said inner ring, an annular flange formed on each said ring, an annular bearing surface formed on said shaft against which the flange formed on said outer ring is adapted to bear frictionally, means bearing at one end on said outer ring flange and engaging in openings formed in said casing at points spaced circumferentially about the defining wall of said shaft opening for yieldingly maintaining said outer ring flange in bearing contact with said bearing surface, and means comprising a fastening for said inner ring engaging the flange thereof and holding said flange in position over said circumferentially spaced openings for sealing said openings and providing a fixed surface against which the yielding means may bear.

In testimony whereof I hereunto affix my signature.

ARTHUR NUTT.